US006450403B1

(12) United States Patent
Martens et al.

(10) Patent No.: US 6,450,403 B1
(45) Date of Patent: Sep. 17, 2002

(54) METHOD AND APPARATUS FOR DEPOSITING ORDINARY CHECKS FROM HOME OR OFFICE

(75) Inventors: Marco Martens, Chappaqua; Charles P. Tresser, Mamaroneck; Robert J. von Gutfeld, New York; Chai W. Wu, Poughquag, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/989,697

(22) Filed: Nov. 21, 2001

Related U.S. Application Data

(60) Provisional application No. 60/252,431, filed on Nov. 24, 2000.

(51) Int. Cl.[7] .............................................. G06F 17/60
(52) U.S. Cl. ..................................... 235/379; 235/380
(58) Field of Search ................................ 235/379, 380; 705/45

(56) References Cited

U.S. PATENT DOCUMENTS

| | | | |
|---|---|---|---|
| 4,027,142 A | 5/1977 | Paup et al. | |
| 4,371,196 A | 2/1983 | von Kempski et al. | |
| 4,786,789 A | 11/1988 | Gaucher | |
| 6,030,000 A | 2/2000 | Diamond | |
| 6,073,121 A | 6/2000 | Ramzy | |
| 6,086,708 A | 7/2000 | Colgate, Jr. | |
| 6,089,450 A | 7/2000 | Koeple | |
| 6,089,610 A | 7/2000 | Greene | |
| 6,282,523 B1 | * | 8/2001 | Jedesco et al. ............. 235/379 |

FOREIGN PATENT DOCUMENTS

JP         8-212268 A  *  8/1996

* cited by examiner

*Primary Examiner*—Harold I. Pitts
(74) *Attorney, Agent, or Firm*—Whitham, Curtis & Christofferson, P.C.; Stephen C. Kaufman

(57) ABSTRACT

An apparatus and method allow to deposit ordinary checks from home or office. A special scanner is used to scan an endorsed check for deposit. The check may have printed thereon encryptions in at least selected locations. Scanning the endorsed check with the scanner to generates a digitized version of the check. The scanner virtually partitions the digitized version of the check into a plurality of regions. These regions may be stripes or zones. Each region is successively examined to extract from the digitized version of the check information from that region. The information extracted from a region is encrypted and transmitted to a bank. Upon acknowledgment from the bank, at least some of the regions of the plurality of regions voided by a form of indelible but non-invasive (e.g. allowing reading after voiding) marking such as punched holes, burned areas, overprinting of a pattern. The processing by the scanner continues until all regions have been processed. This progressively voiding scheme is an important security feature of the invention. The scanner is preferably contained in a secure housing with an encryption processor and the housing preferably includes an arrangement for detecting tampering and preventing normal operation if tampering is detected.

20 Claims, 12 Drawing Sheets

ENDORSE HERE

X

33

DO NOT SIGN/WRITE/STAMP BELOW THIS LINE
FOR FINANCIAL INSTITUTIONS ONLY

\* FEDERAL RESERVE BANK REGULATION CCE

34

SECURITY FEATURES ON THIS DOCUMENT INCLUDE A MICRO-PRINT
SIGNATURE LINE AND SECURITY SCREEN.
ABSENCE OF THESE FEATURES MAY INDICATE ALTERATION.

MR. AND MRS. SMITH
4, 5TH STREET
NEW YORK NY 10000

CHECK#
1-108/210

DATE _____

PAY TO THE
ORDER OF _____

$ _____

_____ DOLLARS

🔒 SECURITY FEATURES
INCLUDED
DETAILS ON BACK

NAME OF BANKS    BANK'S LOGO
ADDRESS OF
BRANCH

FOR _____

X=':BRANCH#:ACCOUNT#"·CHECK#

35

| MR. AND MRS. SMITH 4, 5TH STREET NEW YORK NY 10000 | SIGN$_1$(x) | DATE _____ | CHECK# 1-108/210 |
| --- | --- | --- | --- |
| PAY TO THE ORDER OF _____ | | $ | |
| | | _____ DOLLARS | SECURITY FEATURES INCLUDED DETAILS ON BACK SIGN$_1$(x) |
| NAME OF BANKS BANK'S LOGO ADDRESS OF BRANCH FOR _____ | | BARECODE(SIGN$_1$(x)) _____ | _____ | x=':BRANCH#:ACCOUNT#":CHECK#

FIG. 4C

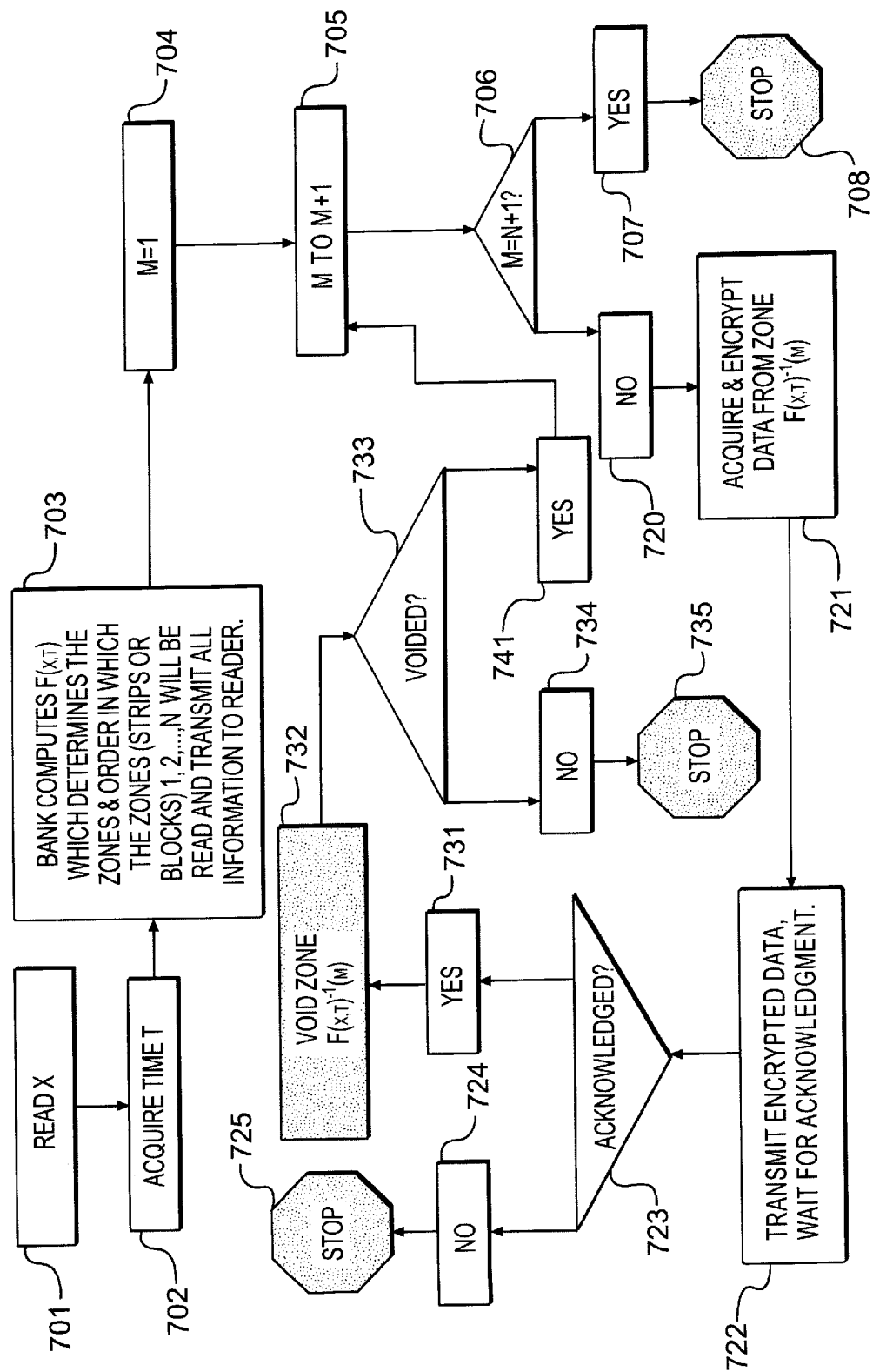
FIG. 7-A

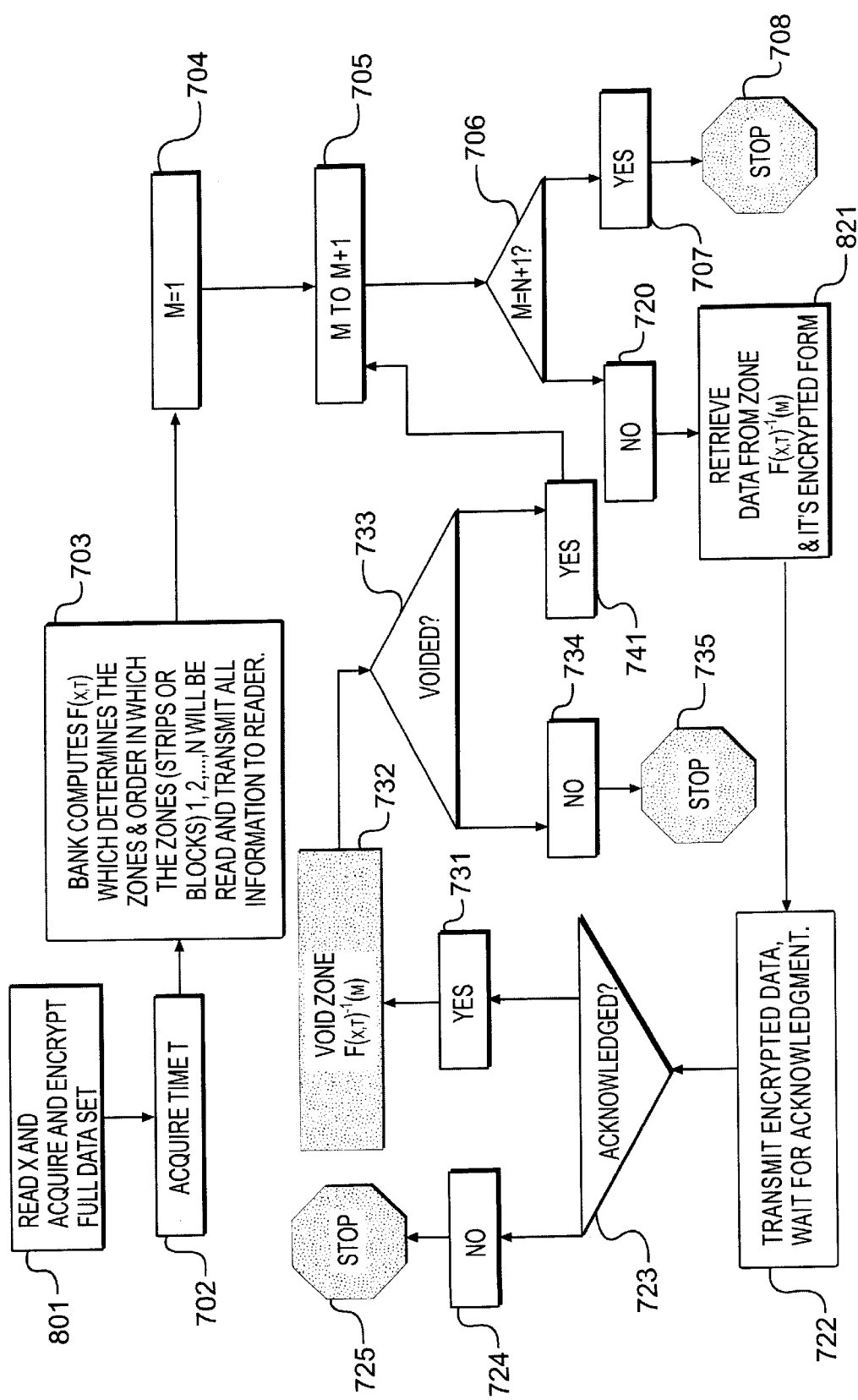
FIG. 7-B

METHOD AND APPARATUS FOR DEPOSITING ORDINARY CHECKS FROM HOME OR OFFICE

CROSS-REFERENCE TO RELATED APPLICATIONS

This application claims the benefit of U.S. Provisional Application No. 60/252,431 filed Nov. 24, 2000. The subject matter of this application is related to the disclosures in U.S. patent application Ser. No. 09/398,028 filed Sep. 17, 1999, by G. Braudaway, P. D. Howard, P. V. Kamesam, H. E. Sachar, F. C. Mintzer, C. W. Wu, J. M. Socolofsky, S. W. Smith, and C. P. Tresser for "Method and System for Remote Printing of Duplication Resistant Documents"; U.S. patent application Ser. No. 09/398,029 filed Sep. 17, 1999, by C. Mengin, H. E. Sachar, M. Martens and C. P. Tresser for "Method and Apparatus for Secure Sale of Electronic Tickets" and U.S. patent application Ser. No. 09/920,740, filed Aug. 3, 2001, by M. Martens and C. P. Tresser for "Method and Apparatus for Depositing Paper Checks from Home or Office". patent applications Ser. Nos. 09/398,028, 09/398,029 and 09/920,740 are assigned to a common assignee herewith and their disclosures are fully incorporated herein by reference.

BACKGROUND OF THE INVENTION

1. Field of the Invention

The present invention generally relates to a method and apparatus for depositing ordinary checks from home or office and the checks used for such deposit and, more particularly, to a method and apparatus which securely converts an ordinary check to a digital form and allows secure electronic data transmission from home or office computer to the payee's bank in order to deposit the check.

2. Background Description

With the development of the World Wide Web (WWW) came the development of home banking, which previously existed on a very small scale. But there are still lots of basic banking operations which so far require to go to a branch or to an Automated Teller machine (ATM). The most important such operation is depositing a check, and more precisely a paper check as they have existed since much before the electronic age. While most of the rest of the world moves away from checks (although at a rather slow pace, about 4% per year in England, for instance), the use of checks is still growing in the U.S.A. Allowing deposit from home would both be more practical for some customers (which helps in particular the banks for their Customer Relationship management), and less costly for the banks. In particular, depositing a check from the payee's location (from home or from the office, or other location remote from the bank or an ATM), assuming it would be reasonably automated, would represent a considerable value for a variety of small, medium, and large businesses. In fact, even in countries where overall check traffic has been significantly decreased, there are businesses which still have to handle an increasing number of checks, which is very costly for them because of the work involved, and also to some extent, because of the errors involved.

When we speak about deposit from home or office, we assume that from a paper check, indeed a little piece of the physical world—we also say an analog entity —we first create a digital entity (we also speak about the digital form of the check). A digital entity is basically a set of symbols with some groups of symbols carrying tags. The tags refer to which part of the real world the group of symbols refers to and/or describe the role of the group of symbols they are attached to, and/or describe the way this group relates to other groups of symbols. Such tags can indeed be explicit, or be implicitly contained in the way the overall set of symbols is formatted.

The digital form of a check does not fully replace the check, as long as the check is not destroyed in the process. We will assume that destroying the paper checks would not be acceptable, and that paper forms of checks may be used in some lawsuit settlements and the like. Thus, recourse to the paper form will only play a role extremely rarely. Consequently, for all practical purposes, we will in fact consider that the paper checks have been transformed to digital entities. Once in digital form, a check becomes quite close to an electronic check such as the ones that have been considered by the Financial Services Technology Consortium (FSTC) (see http://www.fstc.org). Thus, most of the present disclosure will deal with the problem of generating digital entities with security and ease of use for all parties at hand (the payer, the payee, and their banks, and further parties as needed by the protocols). Once in digital form, protocols previously developed for electronic checks, or other forms of electronic payment systems, can be used in our context. On the other hand, what we will describe here to complete the deposit mechanism and its administration could be used for other secure transformations of documents into corresponding digital forms.

A few numbers will illustrate the size of check handling. In the U.S. in 1993, checks represented 80% of the noncash transaction volume for only 13% of the transaction value, with an average value per transaction of $1,150. While the use of checks has been declining in some countries, it is still increasing in some. The handling cost is huge for banks, and even more when bad checks are presented or frauds occur, such as multiple deposit attempts. Beside reducing the processing cost, allowing checks to be transformed to digital entities before being deposited would also help the overall transition to more forms of electronic payment systems.

For a general reference on electronic payment, see for instance *Electronic Payment Systems* by Donald O'Mahony, Michael Pierce, and Hitesh Tewari, Artech House, Boston, 1997.

Problems to be Solved

As we mentioned before, to deposit a check from home or office, we assume the checks will be converted from their analog form to some digital form, in particular to allow data to flow using electronic means of communication. The problem is that digital form allows easy data modification, a door open to easy counterfeiting. Furthermore, the very ease of data flow and copy in electronic form can also facilitate other forms of wrong doing. The main problems to be solved can be formulated as follows:

1. Secure transformation of ordinary checks into a digital form and secure transmission to a bank. Here, the word secure both refers to the difficulty of counterfeiting and to the protection against machine failure.
2. Multiple deposit of any check should be very hard.

The reading of the paper check, involved in the transformation of the check into a digital form, should measure enough details of the check to assure that is it is very hard to make illegitimate checks that do pass the authenticity test based on the reading.

As usual in the security business, very hard essentially means so hard that the cost of defeating the system would most probably be much higher than the benefit.

SUMMARY OF THE INVENTION

It is therefore an object of the present invention to provide an apparatus and method that allow to deposit ordinary checks from home or office while solving all problems we have mentioned above.

According to the invention, a special scanner is used to scan an endorsed check for deposit. Some encrypted indicia may be printed on the check, if desired, in addition to other security features discussed below. Scanning the endorsed check with the scanner generates a digitized version of the check. The scanner virtually partitions the digitized version of the check into a plurality of regions. These regions may be stripes or zones. Each region is successively examined to extract from the digitized version of the check information from that region. The information extracted from a region is encrypted and transmitted to a bank. Upon acknowledgment from the bank, at least some of the regions of the plurality of regions are voided. The processing by the scanner continues until all regions have been processed. This progressive voiding scheme is an important security feature of the invention.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is an illustration of the back of a typical check, as used in the U.S.A.;

FIG. 4B shows a partial partitioning of a check into virtual zones, according to the present invention, in the case that the zones are rectangles which are not all translations of each other;

FIG. 4C shows a partitioning of a check into virtual zones, according to the present invention, in the case that the zones have meaningful contents according to the various data usually printed or later written on a check;

FIGS. 7A and 7B are flow diagrams for the main step of processing the check according to the present invention, in two different preferred embodiments, respectively;

FIG. 8B being a detail of FIG. 8A.

DETAILED DESCRIPTION OF PREFERRED EMBODIMENTS OF THE INVENTION

Figure 1:
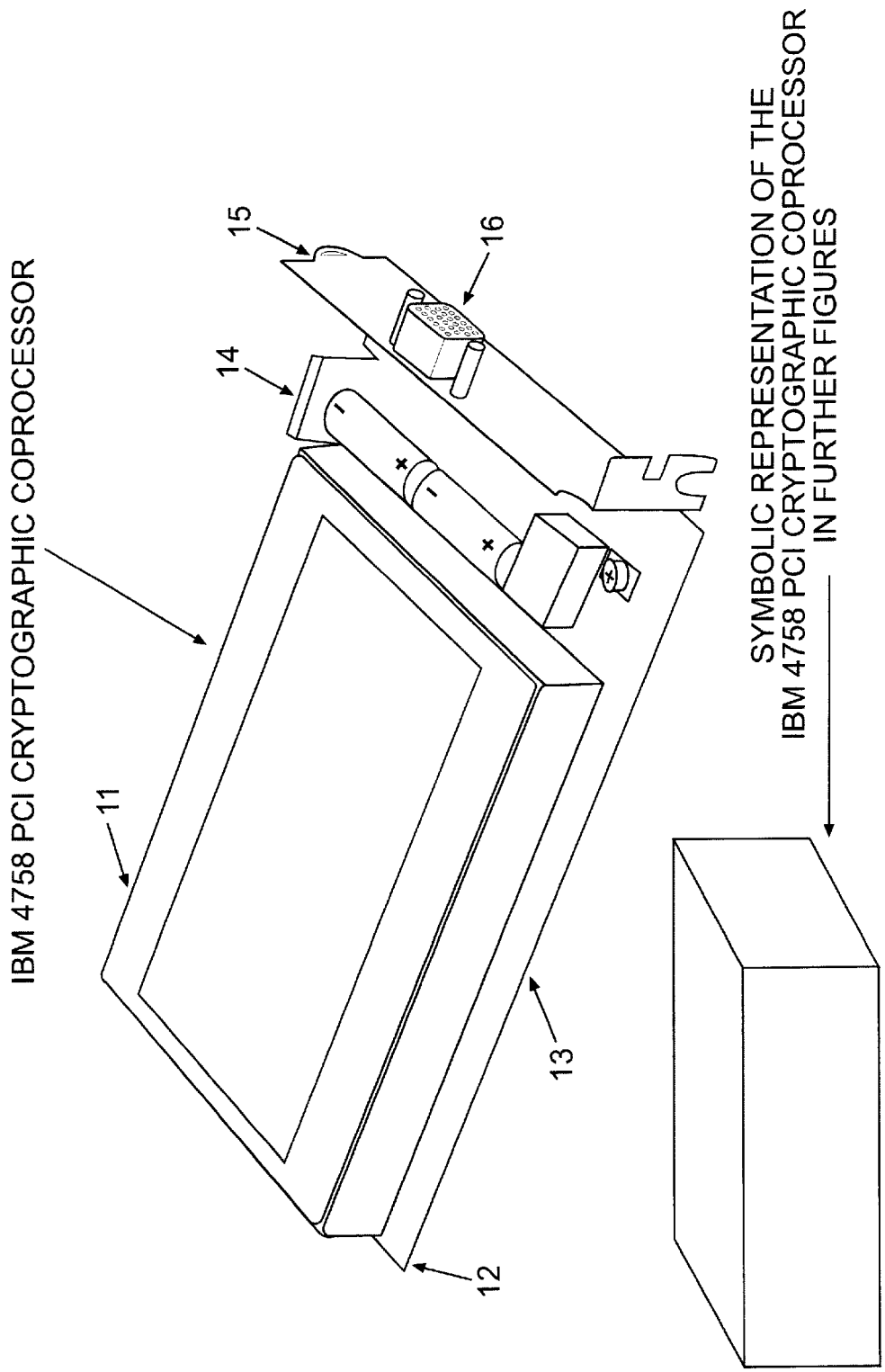
FIG. 1 is a pictorial representation of an actual IBM 4758 PCI Cryptographic Coprocessor.

The FSTC has realized that once in electronic form, check circulation (see for instance the previously mentioned book *Electronic Payment Systems* by D. O'Mahony et al.) can be modified in several ways. For instance:

Deposit-and-clear mirrors the flow for real check, and is what we have in mind for the present invention, in particular for the problem of multiple deposit prevention.

Cash-and-transfer uses a direct link between the payee and the payer's bank, so that the multiple deposit is much easier to protect against, since the emitter's bank can easily take care of its own database.

There are further scenarios in the world of electronic checks. Some of them take these forms of payment further and further away from regular checks. While this may be useful for several purposes, this has no bearing on the problem we consider here of depositing checks from home or from the office. The present invention could be used in a variety of scenarios with minor modifications.

The main problems which need to be addressed, as in usual check processing, are counterfeited checks and multiple deposit of checks. Roughly speaking there are two ways to make multiple deposits.

1) Counterfeiting checks can happen either by completely fabricating a check, using a blank check and imitating the signature of the owner, or changing data on the check such as the amount and/or the name of the payee.

2) As for multiple deposit, the digital world opens new doors for wrong doing, in particular because of the tremendous flexibility of the digital form of an optically scanned check. Typically, sending the same image for deposit to several banks or to first deposit a check from home and then bring it for deposit to another bank must be prevented.

Next to the problem of multiple deposit is the problem of secure transformation of ordinary checks into a digital form and secure transmission to a bank. Here, the word secure refers again to the problem of counterfeiting and to the problem of machine failure.

The present invention involves scanning a check in such a way that the digital data is not accessible to the payee. The scanning process includes as much of the details of the check as needed to assure with high confidence that the check is not counterfeited. In particular, the scan is not just an optical scan but involves as much data about the check as needed to achieve a high enough level of security for the check not to be counterfeited.

The reader and other pieces of analysis equipment should similarly have hardware protection so as to make the access to the digital data from the reading(s) very difficult to achieve. In particular, the optical image could be obtained by a CMOS (Complimentary Metal Oxide Semiconductor) imager designed so that it encrypts the signal in the bulk of the reader, according to methods presently developed by several corporations such as IBM (International Business Machines Corp.). Other sensors involved in the analysis of the analog check should similarly be built so that the signals are encrypted early-on. While this is not mandatory, we prefer to have the check fully enclosed in a box whose integrity is itself protected, while all readings of check data are made and transmitted to the bank where the check is to be deposited.

The processor which takes care of the encryption for transmissions is all contained in secure hardware. For business and all forms of high value and/or high traffic, the secure hardware should have characteristics similar to the IBM 4758 PCI Cryptographic Coprocessor. For domestic use, one may envision having less secure hardware security, as provided at a much lower price by some smart cards, but the lowering of the security level should then be compensated by lower limits on the amounts and traffic authorized with such equipment.

During the reading, the check will be voided on some or all areas of the check whose data have been transmitted to the payee's bank, after non-repudiable acknowledgment by the banks that these area have been properly transmitted; otherwise, multiple deposits would be very easy to perform. This voiding mechanism used as the electronic deposit advances we call "progressive voiding". It allows secure transformation of the check into a digital form with secure transmission to a bank so that, in any circumstance the receiving bank and the payee are able to recover completely the check in case of any technical failure of the transmission with the same level of security at least for the payee as provided by current methods of deposit to a branch or an ATM. The actual voiding of the areas will use piercing, or burning, or stamping, or chemical deposit, or a combination of some of these methods, or others with the same basic effect of being readable both by humans and by the machines used for home deposit. The actual voiding will be controlled by the depositing machine as the deposit progresses, to validate the deposit of the check. If problems occur during such verification, the process will be stopped, and the check will be deposited in the analog form, using again the fact that the data transmitted and the not yet transmitted portions form together a support for the full information about the check.

A database, held at the payer's bank when the invention is implemented by all banks, or by the consortium of banks using the invention in the meantime, is used to register the data (branch, account number, check number) of all checks deposited to avoid multiple deposit of the electronic form. On the other hand, further analog deposit of a check which has been deposited in electronic form is prevented by the voiding process described above.

In case the payer contests the check, an image of the check will be provided to him or her to verify that the repudiation is not the effect of failing memory. If the repudiation is then confirmed, the paper check will be produced by the payee as evidence. As a consequence, the voiding mechanism should be both:

quite recognizable and hard to eradicate, and not overwhelmingly invasive so that authenticity verification of the paper check is not compromised.

The present invention builds on three technologies that we briefly discuss next. The first two are rather generic. They are cryptography and hardware security. The third one is a special combination of the above two; i.e., the IBM 4758 PCI Cryptographic Coprocessor, as an example of a secure cryptography generator (SCG).

Cryptography

The use of private key/public key pairs (or SK/PK pairs; we also say public schemes) as means to encrypt or digitally sign a file or document, of secret encoding keys, and of secure hash functions (such as SHA-1, as fully specified in the Federal Information Processing Standard Publication 180-1) are now well known. A description of these techniques with directions on how to use several of their implementations can be found in *Handbook of Applied Cryptography*, by Alfred J. Menezes, Paul C. van Oorschot and Scott A. Vanstone, CRC Press, 1997.

To fix the ideas, we recall that a digital signature scheme is used in the form of a pair of functions Sign and $Sign^{-1}$ which are inverse of each other, i.e., for a plain text X to be signed, $Sign^{-1}$ (Sign(X))=X. The function Sign is kept secret, being known only to some legitimate owner of the signature and his/her agents. The function $Sign^{-1}$ is known publicly, and accessible for instance through the WWW, through some agency specializing in providing PKI (Public Key Infrastructure), or given away by the owner of the pair to whoever needs to check the identity of the sender and/or that a message is exactly as the owner intended it to be. We also recall that a public encryption scheme is used in the form of a pair of functions Encr and $Encr^{-1}$ which are inverse of each other, i.e., for a plain text X to be signed, $Encr^{-1}$ (Encr(X))=X. The function $Encr^{-1}$ is kept secret, being known only to some legitimate owner of the encrypyion scheme and his/her agents. The function Encr is known. publicly, and accessible for instance through the WWW or through some agency specializing in providing PKI, or given away by the owner of the pair to whoever wants to send the owner a secret message, or keep secret some part of the message.

For definiteness, each time we use a public scheme, one can choose the Rivest-Shamir-Adleman (RSA) protocol as a method to generate and use a SK/PK pair in order to allow for public encryption or digital signature: several other methods could also be used (see, e.g., the *Handbook of Applied Cryptography*). In the case when the functions Sign and $Sign^{-1}$ (or $Encr^{-1}$ and Encr) are produced according to the RSA protocol, it is now preferred to use at least 1024 digits for X and Sign(X) (the formerly often used 512 digits are no longer considered as secure). As a message may contain much more information than the length of the keys, several methods can be used, possibly concurrently, as is well known in the art. For instance, one can split the message into several pieces, some or all of which will be signed, or one can compress the information, for instance using a secure hash function, or one can select a subset of the information, etc. Clearly, the protocol which is chosen has to be known publicly if one desires to use public key cryptography.

Also notice that even if one wishes to use the benefits of public key cryptography, it may be useful to also hide secret information in the messages, so that one could recognize that someone has succeeded to break the keys being used. As usual in the art, it is advisable to change the keys being used every so often, depending on the application, and to keep a list of former keys.

Another important enabler of secure electronic communication is the possibility to exchange secret keys while exchanging only messages which can be understood by third parties. Several protocols have been created to this effect such as Diffie-Hellman. Such protocols allow in particular several secure cryptography generators (SCGs) to have the same keys without the keys being compromised. In this way, the machines can also share one time pad, and other cryptographic functions.

In the sequel, when we speak of a SCG, we speak either of a single machine, or a series of them working in a coordinated way, as a multi-component single machine; memory will have to be shared. The invention does not depend on the distinction between these two cases, as long as the multiple machine is managed properly, avoiding in particular independent signatures by the components.

Hardware Security

While cryptography is an essential enabler for solving many, if not most, security problems, it is certainly not the universal panacea. For instance, there is the problem of storing the key for the cryptographic schemes one uses. This essential issue will be covered in the next point, but there is more. For instance, if data are acquired by some sensor, one has to prevent the data feed from the sensor from being replaced by fabricated or otherwise substitute data. In the case of images, one can use CMOS imagers (an imager is an image generator) built so that the data is encrypted at the source, in the circuitry. Ultra miniaturization, as available now for a variety of sensors, can similarly be used. Furthermore. All reading can be performed in a closed box to protect the integrity of the relation between the sensors and the sensed objects. If the integrity of the box is protected at the macroscopic level, the sensors will then read the objects inside, and encrypt on the fly. Such data can then be communicated, for example, to a remote control system, and actions on the objects (for instance piercing, local burning, etc.) by further machinery included in the closed box can be intertwined with readings.

IBM 4758 PCI Cryptographic Coprocessor

The IBM (International Business Machines Corp.) 4758 PCI (Peripheral Component Interconnect) Cryptographic Coprocessor (4758 for short.) is a programmable, field upgradeable piece of secure hardware that has a general purpose computational power about equivalent to a personal computer (PC) from the early 90's. It is designed to plug into an available PCI connector of the PCI bus of a PC to provide the PC with a secure means of transmitting data over a standard telephone line. As shown in FIG. 1, the 4758 comprises a sealed processor 11 mounted to a printed circuit board (PCB) 12 having a PCI connector 13 along one edge. A battery 14, also mounted on the PCB 12, provides standby power to the processor 11 when the computer in which it is installed is turned off. The purpose of the battery is to maintain data in non-volatile memory within the processor 11. The PCB 12 is attached to a standard PC adapter mounting bracket 15 which fits into a slot at one end and is attached by a screw at the other end in the backplane of the PC cabinet. An RS-232 DB-9 serial connector 16 is mounted to the bracket 15 to permit connection from the 4758 to a modem. When configured in a PC, the 4758 occupies one of the serial port addresses, typically COM-1.

The 4758 performs high speed cryptographic operations, and provides secure key storage. It is both cryptographically secure and able to detect and protect itself against physical attacks (probe, voltage, temperature, radiation). It is in fact one of the only two devices that are Federal Information Processing Standard (FIPS) 140-1 overall 4 certified (hardware and microcode: certificate #35), the other one coming integrated in IBM 390 mainframes (the IBM CMOS (Complementary Metal Oxide Semiconductor) Cryptographic Coprocessor: certificate #40—which is not programmable as is the 4758—while the price of a 4758 is about a couple of thousand dollars. The 4758 is indeed a popular PCI bus interface for servers, and can serve as device driver for Operating Systems (OS) such as Microsoft Windows NT, Linux, and IBM's AIX, OS/2, and OS/390 Operating Systems. Typical use of cryptographic coprocessors such as the 4758 or, some smart cards include High Speed, Bulk Cryptography (for instance for digital movies, in-flight entertainment systems, secure databases, confidential video-conferences, telemedicine, telecommuting, etc.) and Security in Non-Trusted Environments (for instance for smart card personalization, electronic currency dispensers, electronic benefits transfer, server-based smart card substitutes, home banking, certification authorities, secure database key control, electronic postage (e-postage) meters, electronic payments, secret algorithms, secure time stamps, contest winner selection, software usage metering, electronic securities trading, hotel room gaming, etc.).

We have described in great detail the virtues of the 4758 because these virtues are the elements which are needed for the present invention to be implemented with the required level of high security. Any device with similar virtues could be used as well. The fact is that it is by no means obvious a priori that a machine with all these virtues could be built. We wanted to establish the feasibility—at the time of writing—of our overall invention by recalling in details that assembling all the needed virtues in a machine can indeed be done, and giving an example proving that.

In the sequel, we will use SCG as an acronym for secure cryptography generator, an example of which is the 4758. What we mean is a machine which is secure for both physical and cryptographic attacks.

The Overall Process from the User's Point of View

The payer uses ordinary checks and processes them in his or her preferred way, for example writing or printing the payee's name and amount (numbers and text) and signs as for checks to be deposited as usual. The payee has a secure reader built according to the present invention which can be used as a stand alone machine or attached to his or her PC. A figure and description of the imager will be given in the sequel.

The payee endorses the check as in a usual check deposit. Then the payee determines the bank and account number where the check should be deposited. The secure reader scans the check and performs the transmission to the bank. The process which takes place in the secure piece of hardware consists of scanning, progressive voiding, encryption and transmission to the bank according to the principles described above, and detailed below.

Checks

Figure 2:
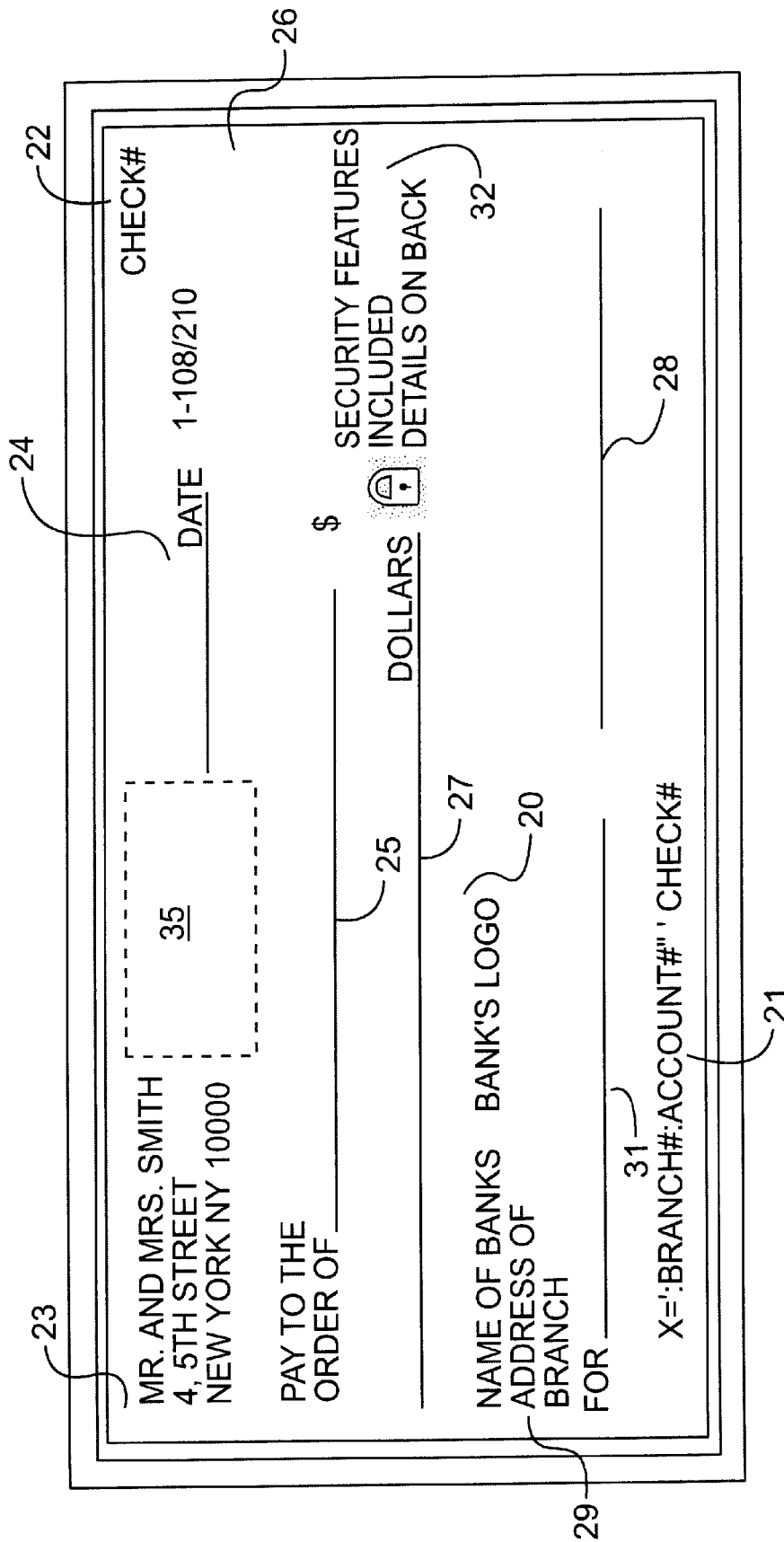
FIG. 2 is an illustration of the front of a typical check, as used in the U.S.A.

Checks are very familiar objects to most adults in a country like the U.S. where they are still much in use. We will keep American checks in mind for definiteness while most, if not all, of what is described here would apply equally as well to checks from most countries. FIGS. 2 and 3 represent a typical American check, respectively on the front and back sides. There are several distinctive fields on the check. We call X the long number usually on the bottom left of the face of the check at 21, made by concatenating the branch number, the account number, and the check number for that account. The check number itself is repeated, usually on the upper right corner of the face at 22. The name and address of the account owner (an individual or a company) is usually on the upper left of the face at 23, sometimes also with a telephone number, and/or some other sorts of numbers in the case of a corporation. Different fields to be written on will carry the date at 24, the payee's name (individual or business) at 25, the numerical amount at 26, and the written amount at 27. A field is designed to carry the signature at 28. The name of the bank appears at 29. The logo of the bank appears at 30. A place to write what the check is for appears at 31. Sometime a notice is given that the check is equipped with counterfeiting adverse features at 32, referring to the back of the check for more details. On the back of the check as shown in FIG. 3, an area is reserved for endorsement at 33, and some description of the counterfeiting adverse features may be given at 34, as indicated at 32 in FIG. 2, with advice to people to reject the check if some of these features are compromised.

Figure 4A:
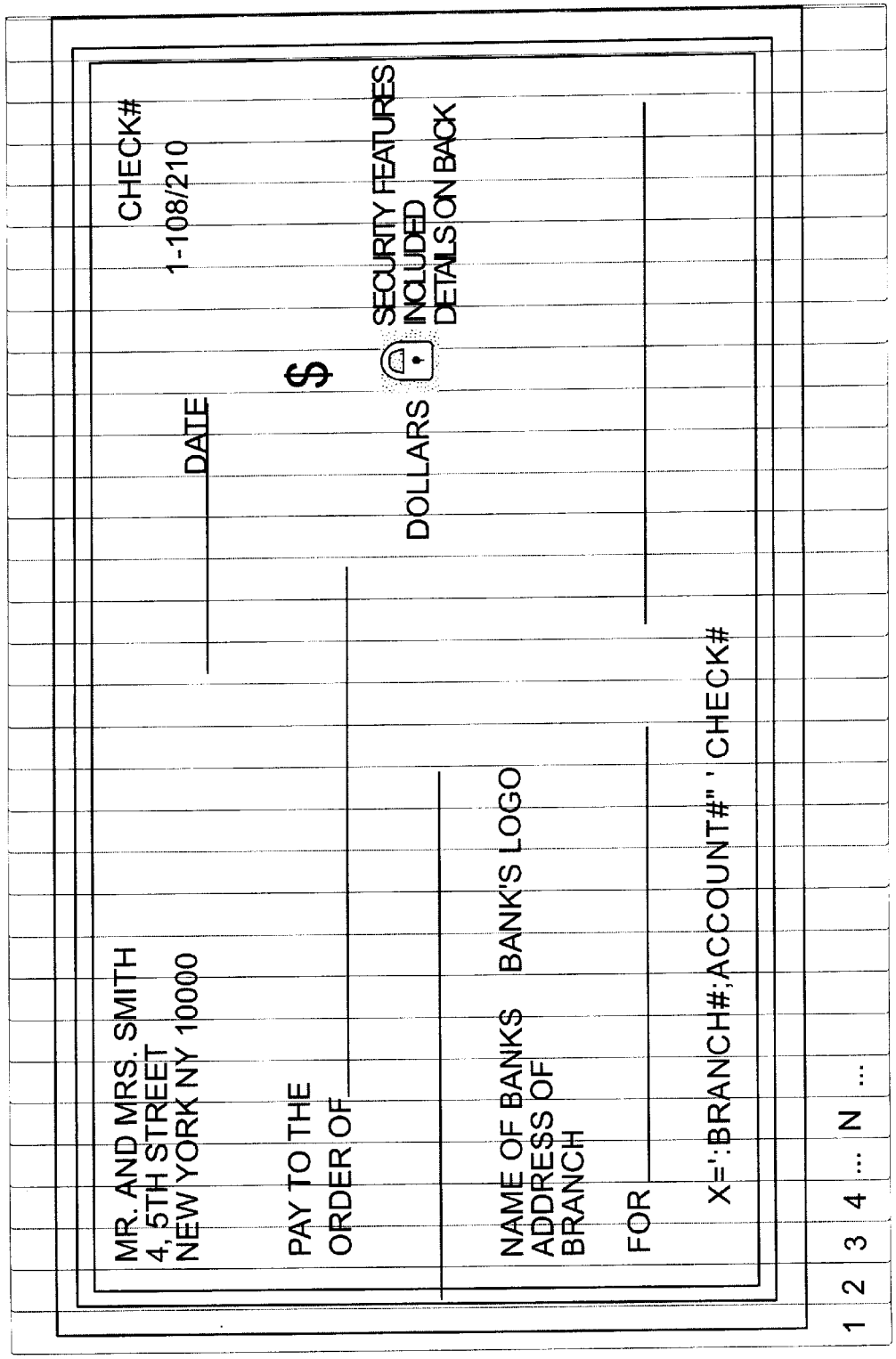
FIG. 4A shows the check of FIG. 2 partitioned into virtual zones, according to the present invention, in the case that the zones are parallel strip from top to bottom.

Each check to be processed according to the present invention will be virtually partitioned into zones. With reference now to FIG. 4A, the zones can be parallel strips, which may all have the same width. These steps then carry naturally an ordering number, say from left to right if the strips are vertical and one is in a country with left to right writing.

Alternatively, as illustrated in FIGS. 4B and 4C, the partition may be done in different types of zones. In all cases the partition could either only depend on the size of the check, or also depend on specific check information such as the data X, or a combination of X and the time at which the check is processed (where time includes the date). The partition will be one of the first steps of the processing of the check, and will be performed on an image of the check by the reader.

Now with reference to FIGS. 5 and 6 the reader will be described. The check reader is an online device which works as a stand alone machine (then the reader also computes, transmits, etc., as we will describe) or coupled to a computer, in which case it will do more of the processing than just reading. In the illustrated example, the check reader 50 is connected to a personal computer (PC) 58 which, in turn, is in communication with a bank 59. The communication with the bank may be by direct dial up connection over a telephone line, but in the preferred embodiment, the connection will be made over the Internet.

The secure box or housing of the check reader 50 must perform certain functions. First it must receive the check. To do so it includes a check transport 56. Second it must read aspects of the check which may be of multiple types such as the optical image and special security features. Accordingly, there are preferably a plurality of readers 52 included in the secure box of the check reader 50. Third, the check reader 50 must perform progressive voiding such as by punching small holes in selected areas of the check and a voider 53 is also included for this purpose. Fourth, the check reader 50 performs cryptographic processing and communication to the outside of the secure box. This function is provided by processor 57. Fifth and finally, the enclosure of the secure box of check reader 50 must be secure and various possible arrangements for detecting tampering are schematically indicated by excitation source 54 and sensor 55. A plurality of such arrangements may be provided and are preferred, depending on the application (e.g. less protection may be suitable for a trusted client or in an automated teller environment in a public place). An example of such an arrangement would be measurement of the geometry of the interior of the secure box by a laser beam, acoustic energy or both whereby any interruption or other change in the beam(s) would indicate an attempt to tamper with the secure box.

Figure 5:
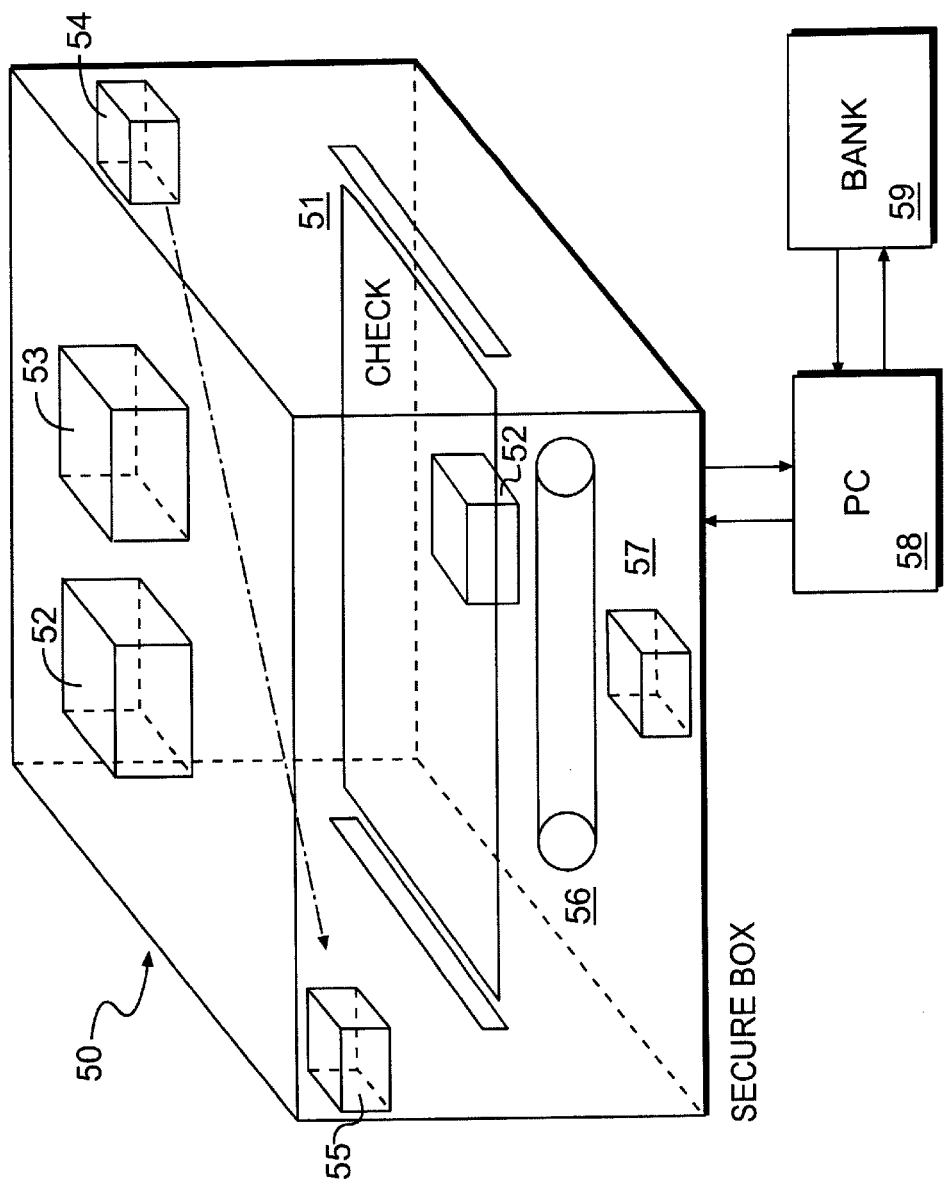
FIG. 5 is a schematic representation of a scanner that would read the check when it is processed according to a preferred embodiment of the present invention.
Figure 6:
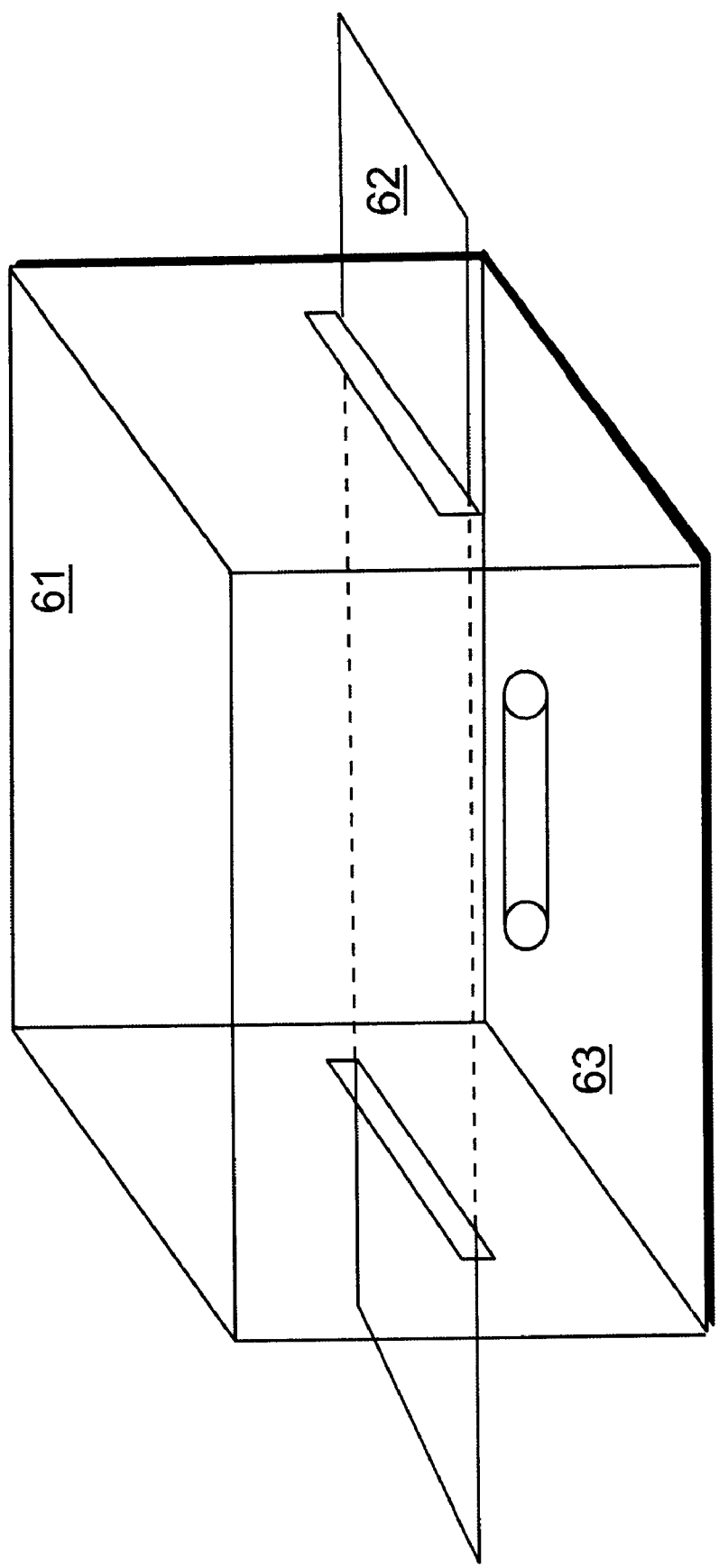
FIG. 6 is a schematic representation of a scanner where the check would pass through when it is processed according to another embodiment of the present invention.

While the reader processes a check, we prefer the check to be completely enclosed in a special chamber of a secured box in which all operations to be performed on the check will be done while the reader is on line with the bank where the check is to be deposited, as illustrated in FIG. 5. To the contrary, FIG. 6 shows a structure for the reader where the check 62 passes through the active part of the reader on transport mechanism 63 but is only partially contained within secure box 61 (which also contains readers, a voider and a tamper detection arrangement such as that described above). Such an embodiment of the check reader may be less expensive but would be somewhat less secure than the embodiment of FIG. 5. Nevertheless, such an embodiment may be entirely sufficient for some applications such as use by a trusted client. It should also be appreciated that some security features of either embodiment other than the reading, encryption and voider can be simplified or even omitted, depending on the degree of trust accorded to the user. This could also be realized but is not our preferred choice as security is harder to enforce in this case.

Coming back to the preferred configuration of FIG. 5, protective systems will be used to prevent the reader from functioning normally if altered, or if the box is not hermetically closed during the operation. For instance, one or more laser beams may be shined under the command of the bank, at an angle determined by the bank, continuously or at times chosen by the bank, and the signals induced by the ray on some photocells will allow recognition if the geometry of the chamber is abnormal or if it changes abnormally during operation. Sounds and other waves can be used instead or to complement the laser beams. A complex net can cover essential components of the readers, and current can similarly be generated and measured to guarantee integrity of the parts.

The reader is equipped with an imager, preferably a secured CMOS (Complementary Metal Oxide Semiconductor) imager, and some other sensors such as a precise thickness sensor which can measure the thickness at various places on the check, and a magnetic reader to capture the magnetic based security features of the check. These will appear in general in the form of MICR (Magnetic Ink Character Recognition)—compatible strings of characters, that allow both easy machine reading and some level of protection against counterfeiting. The fonts used for such magnetic characters depend on the country; i.e., MICR E13B font in the United States, Canada, Puerto Rico, Panama, UK, and MICR CMC-7 font in Mexico, France, Spain and most Spanish speaking countries. Others sensors with which the reader will be equipped are micro-chemical analyzers, fine optics to verify the very fine structure of the check and various micro prints, and more generally enough equipment to check all usual security features on checks, which may depend on where the machine is to be used. Several systems have indeed been proposed to enhance the security of checks or to read such protection. These include U.S. Pat. No. 6,089,610 to J. D. Greene for a security system for a document utilizing a combination of fluorescent and other encryption data printed with visible and invisible ink, U.S. Pat. No. 6,086,708 to G. Colgate, Jr. related to holograms on a check, U.S. Pat. No. 6,073,121 to E. Y. Ramzy for printing on checks an encrypted version of data printed in clear, U.S. Pat. No. 6,030,000 to R. I. Diamond on thermochromatic fingerprint images printed with thermochromatic ink on checks), U.S. Pat. No. 4,371,196 to W. von Kempski and F. Kirstein related to putting threads in paper for security, U.S. Pat. No. 6,089,450 to J. Koeple, U.S. Pat. No. 4,786,789 to M. M. Gaucher, and U.S. Pat. No. 4,027,142 to R. E. Paup and J. F. Blair, all relating to MICR reader and check processing.

With reference now to FIG. 7A, the check is processed as follows in the reader (during the processing, security checks on the integrity of the system can be performed as we have described above). At function block 701, the reader captures the concatenated information X=:branch#: account#: check#. Alternatively, we refer now to FIG. 7B, the reader performs all initial readings at function block 801 (i.e., all reading before the check is altered by the process) at the inception of the process, which is a reasonable option as the integrity of the box is guaranteed. The data are also encrypted. As discussed previously, the encryption should be inseparable from the data acquisition as much as possible for better security.

In the sequel, FIGS. 7A and 7B do not differ any more, except that function block 721 differs from function block 821 according to the difference between function blocks 701 and 801. Then at function block 702, the reader acquires time T from the bank. At function block 703, the bank then computes a cryptographic function $F_{(X,T)}$, which in turn determines the zone partition as discussed in above and an order in which the zones will be processed. The bank keeps this information (or at least X and T from which the rest can be reconstructed by the bank) and transmits it to the reader. The index m, when increased, will designate the successive zones being processed, after the reordering process described above. At function block 704, a counter containing the count m is initialized at m=1. At function block 705, the index m is increased by 1. We denote by N the total number of zones. At decision block 706, a determination is made as to whether m=N+1. If m=N+1, the process is stopped at 708. One can choose that the bank then sends a message at function block 707 telling that the check has been processed and describing all main data associated to the check, such as X, the amount, the date of processing. If m≠N+1, processing continues.

In FIG. 7A, at function block 721, the reader acquires data from zone $F_{(X,T)}^{-1}$ (m), while in FIG. 7B, at function block 821, the reader retrieves the data from zone $F_{(X,T)}^{-1}$ (m) from what has been acquired at function block 802.

Figure 8A:
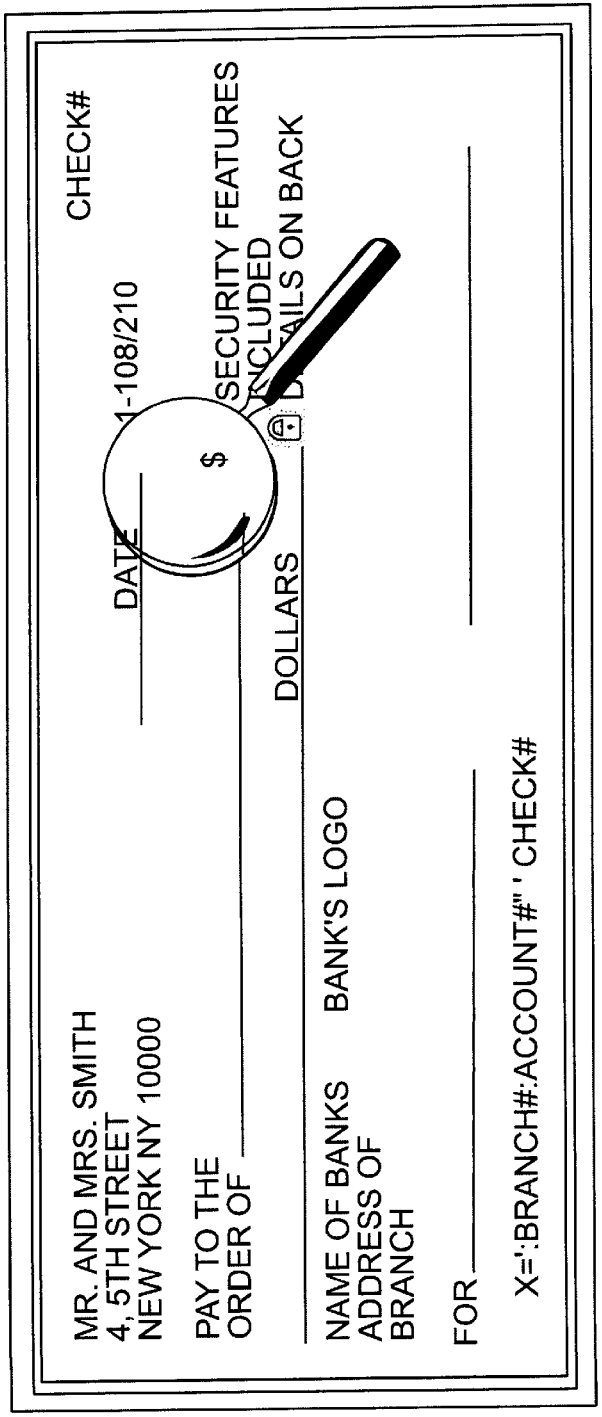
FIGS. 8A and 8B are pictures of the front of a typical check, as used in the U.S.A., also showing some typical counterfeiting features, some of which a check reader devised according to the present invention would preferably be able to detect.
Figure 8B:
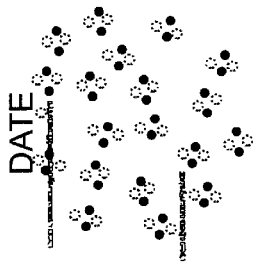
Figure 9:
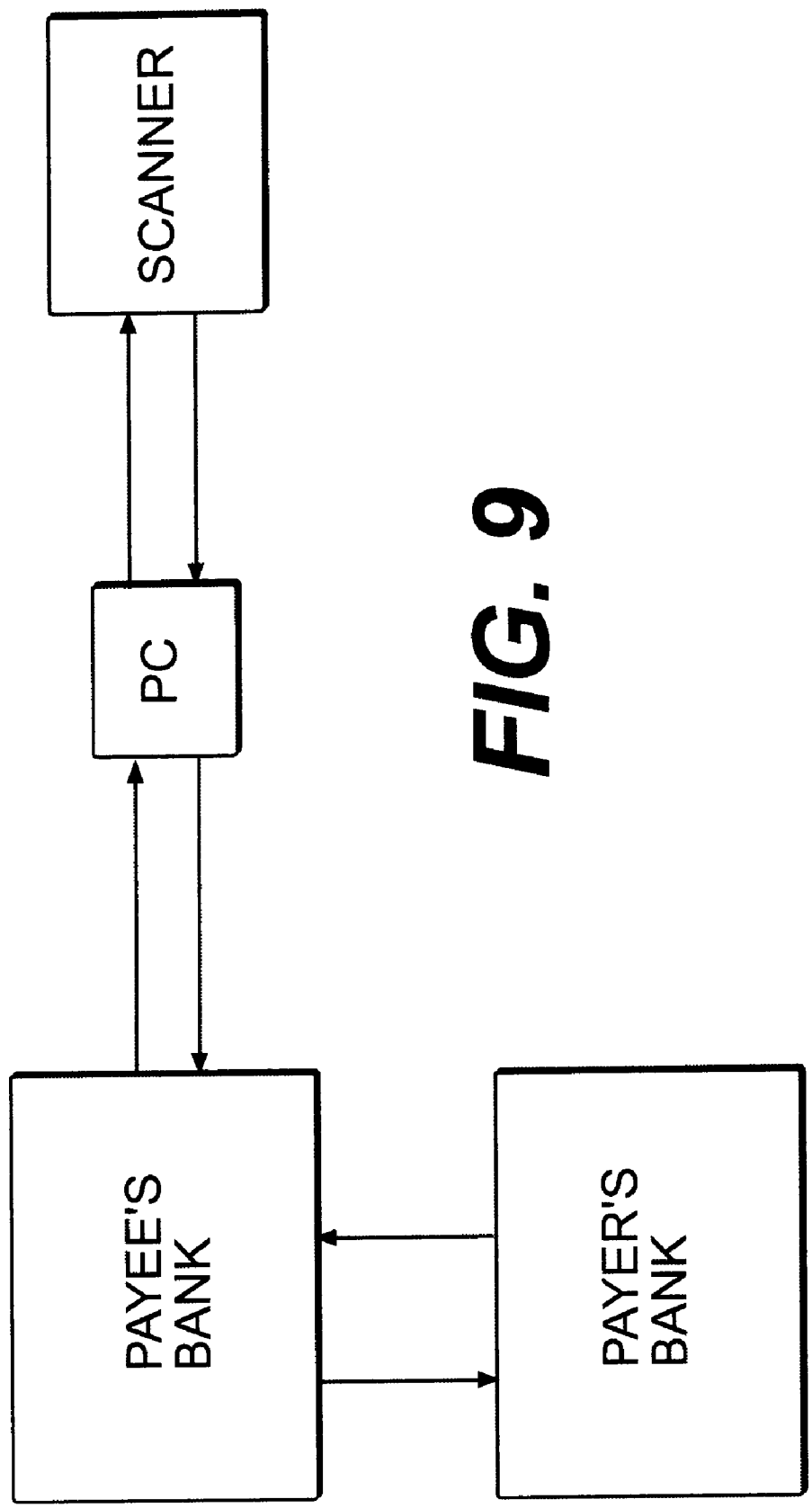
FIG. 9 is a flow diagram representing the interactions between reader, payer's bank and payee's bank.

As discussed previously, such data contain, but are not restricted to, the image of the check. In particular, the data acquisition should pick the counterfeiting protection of the check, some of which in the visual class are represented in FIGS. 8A and 8B. Micro-screen and micro prints may be placed on special lines such as the signature line. The visual details will not all be transmitted nor stored as the fine resolution would create too much data. For instance, the finest optical inspection will be carried out at special spots, some or all of which are decided at the bank, possibly depending on X and T. The data are also encrypted at function block 721, or have been encrypted at function block 801, preferably in a way inseparable from the data acquisition as already discussed. At function block 722, the encrypted data are transmitted to the bank, and one waits for a committing acknowledgment from the bank to continue the process as depicted in FIG. 9.

At each stage, if too much time has elapsed since T, the bank may declare the check unacceptable in electronic form, and it will need to be deposited in paper form. At decision block 723, a determination is made as to whether an acknowledgment has been received from the bank. If no acknowledgment is received after a reasonable amount of time, and after prompting the bank for an answer if so chosen, the process stops at 725. The check will have to be deposited in paper form. If the acknowledgment comes and is recognized as valid by the reader, the process continues. At function block 732, zone $F_{(X,T)}^{-1}$(m) is voided. In fact, one does not have to void all zones, as long as enough zones are voided. One will make sure that the voiding mechanism does not prevent authenticating the paper check and all data printed or written on it. Voiding processes include piercing, printing in a indelible/nonerasable way, burning, etc. At decision block 733, the bank makes the reader check that voiding has been performed according to the protocol, and a decision is made depending on whether voiding can be verified by the bank. If it cannot be done, the process stops at 735. The check will have to be deposited in paper form. Otherwise, the process continues at function block 705 where m is increased by 1.

The processing of check as described here could be greatly simplified if one accepts that checks be endorsed on the front rather than on the back. One place to do that is between the zones 23 and 24 in FIG. 2 as indicated at 35 in FIGS. 2 and 4B. The checks could indeed be prepared to accommodate such endorsing, either at the time they are printed, or using a stamp that the payee would use to designate and delimit the endorsement area.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method of depositing paper checks from a location remote from a bank or Automatic Teller Machine (ATM) comprising the steps of:
   endorsing a check;
   scanning the endorsed check with a scanner to generate a digitized version of the check;
   virtually partitioning the digitized version of the check into a plurality of regions;
   successively extracting from the digitized version of the check information from the plurality of regions;
   encrypting information extracted from a region and transmitting the encrypted information to a bank; and
   upon acknowledgment from the bank, progressively voiding at least some of the regions of the plurality of regions until all regions have been processed.

2. The method of depositing paper checks recited in claim 1, further comprising the step of stopping the depositing process if acknowledgment is not received from the bank, requiring deposit of the paper check.

3. The method of depositing paper checks recited in claim 2, further comprising the step of stopping the depositing process if a region is not voided, requiring deposit of the paper check.

4. The method of depositing paper checks recited in claim 1, wherein the step of scanning is performed by a secure reader which captures concatenated information X=:branch#: account#: check#.

5. The method of depositing paper checks recited in claim 4, further comprising the step of acquiring time T from the bank.

6. The method of depositing paper checks recited in claim 5, further comprising the steps of:
   computing by the bank a cryptographic function $F_{(X,T)}$ which determines the virtual partitioning of the check and an order in which the zones will be processed; and
   transmitting by the bank the cryptographic function $F_{(X,T)}$ to the reader.

7. The method of depositing paper checks recited in claim 6, further comprising the step of stopping the depositing process by the bank if too much time has elapsed since T, requiring deposit of the paper check.

8. The method of depositing checks recited in claim 1, the step of scanning includes data acquisition of counterfeiting protection of the check.

9. The method of depositing checks recited in claim 1, wherein the step of progressively voiding does not prevent authenticating the paper check and all data printed or written on it.

10. The method as recited in claim 1, wherein said check has encryption indicia printed thereon in at least a selected location and said endorsing step obscures some of said encryption indicia.

11. The method as recited in claim 1, wherein said zones are in parallel strips.

12. The method as recited in claim 1, wherein said zones are rectangules.

13. The method as recited in claim 1, wherein said zones correspond to areas printed on a check where meaningful data is to be written.

14. The method as recited in claim 1, wherein said endorsing step is performed on a side of said check including said plurality of regions.

15. A secure check reader including an optical sensor for reading a portion of a document, an encryption processor for encrypting an output of said optical sensor, means for communicating an encrypted output of said optical sensor to a remote processor and receiving an return signal, and.

means for indelibly marking a selected area of said document responsive to said return signal.

16. The secure check reader as recited in claim 15, further including a secure housing.

17. The secure check reader as recited in claim 16, wherein said secure housing includes means for detecting tampering with said secure housing, and means for preventing normal functioning of said secure check reader responsive to said means for detecting tampering.

18. The secure check reader as recited in claim 15, in combination with an automated teller machine.

19. The secure check reader as recited in claim 15, wherein said means for indelibly marking includes at least one of a hole punch, means for burning a mark on said document and means for printing indicia.

20. The secure check reader as recited in claim 16, wherein said secure housing encloses said document during operation of said optical sensor and said means for indelibly marking.

* * * * *